(12) United States Patent
Bangura

(10) Patent No.: US 8,531,078 B2
(45) Date of Patent: Sep. 10, 2013

(54) INTERSPERSED MULTI-LAYER CONCENTRIC WOUND STATOR

(75) Inventor: John F. Bangura, Rockton, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 322 days.

(21) Appl. No.: 13/116,533

(22) Filed: May 26, 2011

(65) Prior Publication Data

US 2012/0299431 A1 Nov. 29, 2012

(51) Int. Cl.
*H02K 3/04* (2006.01)

(52) U.S. Cl.
USPC .......................................... 310/208; 310/179

(58) Field of Classification Search
USPC ..................... 310/179, 180, 208, 206, 207
See application file for complete search history.

(56) References Cited

U.S. PATENT DOCUMENTS

| | | | |
|---|---|---|---|
| 4,492,890 A | 1/1985 | MacDonald | |
| 5,325,007 A | 6/1994 | Huss et al. | |
| 5,708,316 A * | 1/1998 | Ishida | 310/184 |
| 6,011,339 A * | 1/2000 | Kawakami | 310/208 |
| 6,376,775 B1 | 4/2002 | Leijon et al. | |
| 6,570,290 B2 | 5/2003 | Kazmierczak | |
| 6,707,205 B2 | 3/2004 | Johnsen | |
| 7,005,772 B1 | 2/2006 | Frederick et al. | |
| 7,009,320 B2 | 3/2006 | Akita et al. | |
| 7,075,399 B2 | 7/2006 | Saban et al. | |
| 7,208,854 B1 | 4/2007 | Saban et al. | |
| 7,468,569 B2 | 12/2008 | Hirzel | |
| 7,928,624 B2 * | 4/2011 | Huppunen et al. | 310/179 |
| 8,384,263 B2 * | 2/2013 | Hiramatsu et al. | 310/208 |
| 2011/0241472 A1 * | 10/2011 | Tanaka et al. | 310/208 |

* cited by examiner

*Primary Examiner* — Nguyen N Hanh

(74) *Attorney, Agent, or Firm* — Carlson, Gaskey & Olds, P.C.

(57) ABSTRACT

A stator includes a stator support having multiple axially extending circumferentially arranged slots. Multiple phases each include multiple coils. Each of the coils has first and second opposing sides of conductor provided in the slots. A conductor in a second side of a first phase first coil is interspersed with a conductor in a second phase first coil. The conductors in a first side of the first phase first coil are arranged adjacent to one another and non-interspersed.

18 Claims, 3 Drawing Sheets

SC—DENOTES THE START OF THE COIL WIRE
FC—DENOTES THE FINISH OF THE COIL WIRE
N—DENOTES NORTH POLARITY
S—DENOTES SOUTH POLARITY

| SLOT | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| LAYER1 | A1 | A1 | A1 | C1 | C1 | B4 | C4 | B4 | A1- | B4 | A1- | C1- | A1- | C2- | C2- | B2- | B2- | B2- |
| LAYER2 | B3- | A4 | C4 | A4 | C4 | C1 | B1 | B1 | B1 | A2- | A2- | A2- | C2- | C1- | B1- | C1- | B1- | A2 |

| 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|
| A3 | A3 | A3 | C3 | C3 | B2 | C2 | B2 | A3- | B2 | A3- | C3- | A3- | C4- | C4- | B4- | B4- | B4- |
| B1- | A2 | C2 | A2 | C2 | C3 | B3 | B3 | B3 | A4- | A4- | A4- | C4- | C3- | B3- | C3- | B3- | A4 |

SC—DENOTES THE START OF THE COIL WIRE
FC—DENOTES THE FINISH OF THE COIL WIRE
N—DENOTES NORTH POLARITY
S—DENOTES SOUTH POLARITY

US 8,531,078 B2

INTERSPERSED MULTI-LAYER CONCENTRIC WOUND STATOR

BACKGROUND

This disclosure relates to a generator stator, and more particularly, the disclosure relates to a stator winding configuration.

Concentric windings are typically used in stator windings of high voltage DC generators. Such winding configurations are typically easy to wind and inexpensive in that the windings can readily be automated using existing equipment.

In conventional or typical concentric windings, the coils of the phase groups are nested and concentrically disposed about a common axis with the innermost coils spanning a smaller portion of the pole pitch and the outermost coils spanning a larger portion of the pole pitch. The conductors of the opposing sides of the coils of the phase groups are typically located in adjacent slots. The coils of the phase groups are progressively larger in span starting from the innermost coils that span a smallest portion of the pole pitch to the outermost coils that span the largest portion of the pole pitch. The outer most coils in the nests typically span a full pole pitch.

One drawback of a typical winding configuration is that the position of the conductors relative to other conductors within the winding produces undesirable harmonics in the magnetomotove force (MMF) waveform and stator winding terminal voltage waveforms. As a result, this type of winding is less favorable for use in constant speed, constant frequency and variable frequency generators that require terminal voltage waveforms that are more sinusoidal. These harmonics can lead to poor power quality, extraneous noises in communication equipment in close proximity, and parasitic losses and heating in the machine.

One type of single layer winding configuration uses concentric coils having opposing sides that are interspersed with the opposing sides of coils of the other phase. While this approach may reduce some harmonics in single layer winding configurations, undesirable harmonics remain.

SUMMARY

A stator includes a stator support having multiple axially extending circumferentially arranged slots. Multiple phases each include multiple coils. Each of the coils has first and second opposing sides of conductor provided in the slots. A conductor in a second side of a first phase first coil is interspersed with a conductor in a second phase first coil. The conductors in a first side of the first phase first coil are arranged adjacent to one another and non-interspersed.

One example stator includes a stator support having multiple axially extending circumferentially arranged slots providing two winding layers. Three phases each include multiple coils. Each of the coils has first and second opposing sides of conductor provided in the slots. A conductor in a second side of a first phase first coil is interspersed with a conductor in a second phase first coil in a first layer. The conductors in a first side of the first phase first coil are arranged adjacent to one another and non-interspersed. A conductor of a third phase first coil is interspersed with conductors of the first phase first coil second side in the first layer.

BRIEF DESCRIPTION OF THE DRAWINGS

The disclosure can be further understood by reference to the following detailed description when considered in connection with the accompanying drawings wherein.

DETAILED DESCRIPTION

Figure 1:
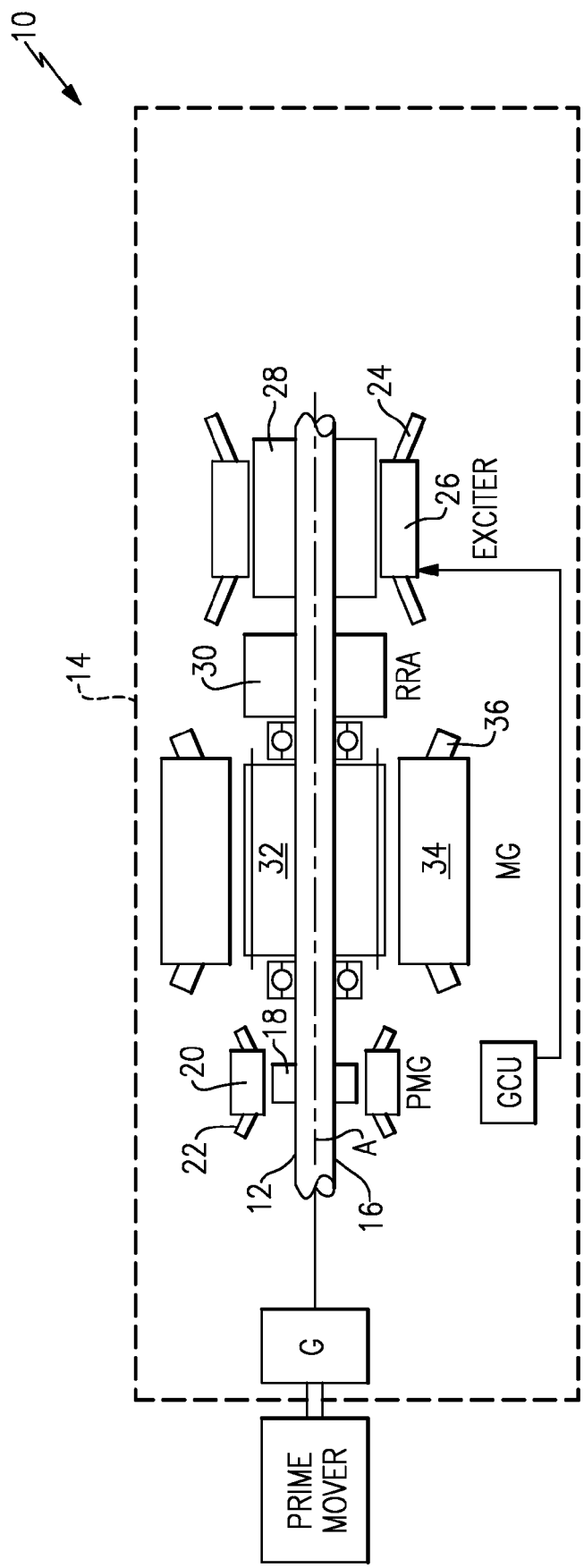
FIG. 1 is a schematic view of a prior art example generator system.

FIG. 1 illustrates a general schematic block view of a brushless electric generator system 10 that includes a rotor assembly 12 driven about an axis of rotation A by a Prime Mover such as a gas turbine engine. It should be understood that although a synchronous generator is described, the example stator could be used in other applications. It should also be understood that although a particular component arrangement is disclosed in the illustrated embodiment, other arrangements would benefit from the disclosed stator.

The generator system 10 includes a step-up gearbox G, a permanent magnet generator (PMG) for Generator Control Unit (GCU) power and a Main Generator (MG) arranged within a housing 14. Rotor field current is supplied from the output of a rotating rectifier assembly (RRA) 30, which is powered by an Exciter. The GCU provides electrical current to the Exciter field converted from the PMG. The RRA 30 may be located around and/or within the shaft 16.

The system 10 includes a rotor assembly 12, which supports a series of permanent magnets 18. A stator 20 provided with windings 22 surrounds the magnets 18 and provides the PMG. Electrical current generated in the winding 22 during rotation of the rotor shaft 16 is provided via suitable conductors and the GCU, to windings 24 in an exciter stator 26. Axially aligned with the exciter stator 26 and carried by the rotor shaft 16 are windings 28 in which alternating current is induced during rotation of the rotor shaft 16.

The alternating current induced in the windings 28 is communicated to the RRA 30 where it is rectified to direct current typically from three phase alternating current. Direct current from the RRA 30 is then fed to a main field winding 32 located in alignment with a main generator stator assembly 34 of the MG. The main stator assembly 34 includes windings 36 in which an alternating current is induced and which, by suitable conductors (not shown), may be connected to suitable loads.

The disclosure relates to stator windings, such as the windings 22, 24, 36; however, it should be understood that the disclosed winding configuration could be applied to rotor windings as well. Accordingly, in this disclosure a "stator support" should be understood to include a rotor support. The term "adjacent" means slots immediately circumferentially next to one another, regardless of layer. The term "interspaced" means non-adjacent slots regardless of layer, for example, a pair of slots with a single slot circumferentially between the pair. The term "interspersed" means circumferentially between interspaced slots regardless of layer. Although a double layer coil arrangement is disclosed, aspects of this disclosure can be used for single layer arrangements or arrangements having three or more layers.

Figures 2, 4:
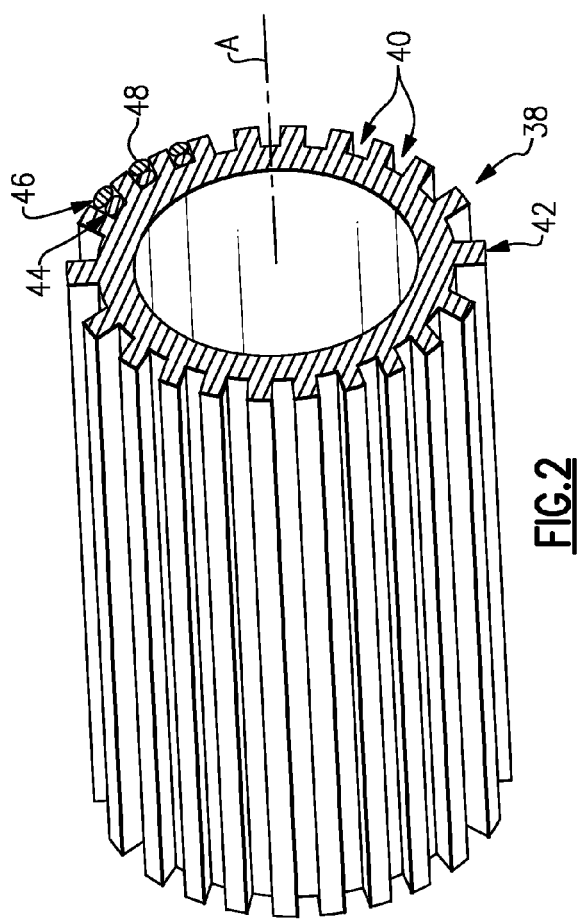
FIG. 2 is a schematic perspective view of a stator structure having slots with several conductors arranged within the slots providing two layers.
FIG. 4 is a table depicting an arrangement of phase coil conductors within the slots of an example thirty-six 4-pole slot stator structure.

Referring to FIG. 2, a stator support 38 includes multiple axially extending slots 40 that are provided in a circumference 42, which is an outer circumference in the example. In the example, the stator support 38 includes thirty-six slots arranged at about every 10° about the outer circumference, although the disclosure applies to different slot configurations. Multiple layers 44, 46 of conductor 48 are arranged in the slots 40 in a configuration designed to reduce harmonics. Although two layers are disclosed in the example, features of the disclosure could be applied to fewer or more than two layers.

Figure 3:
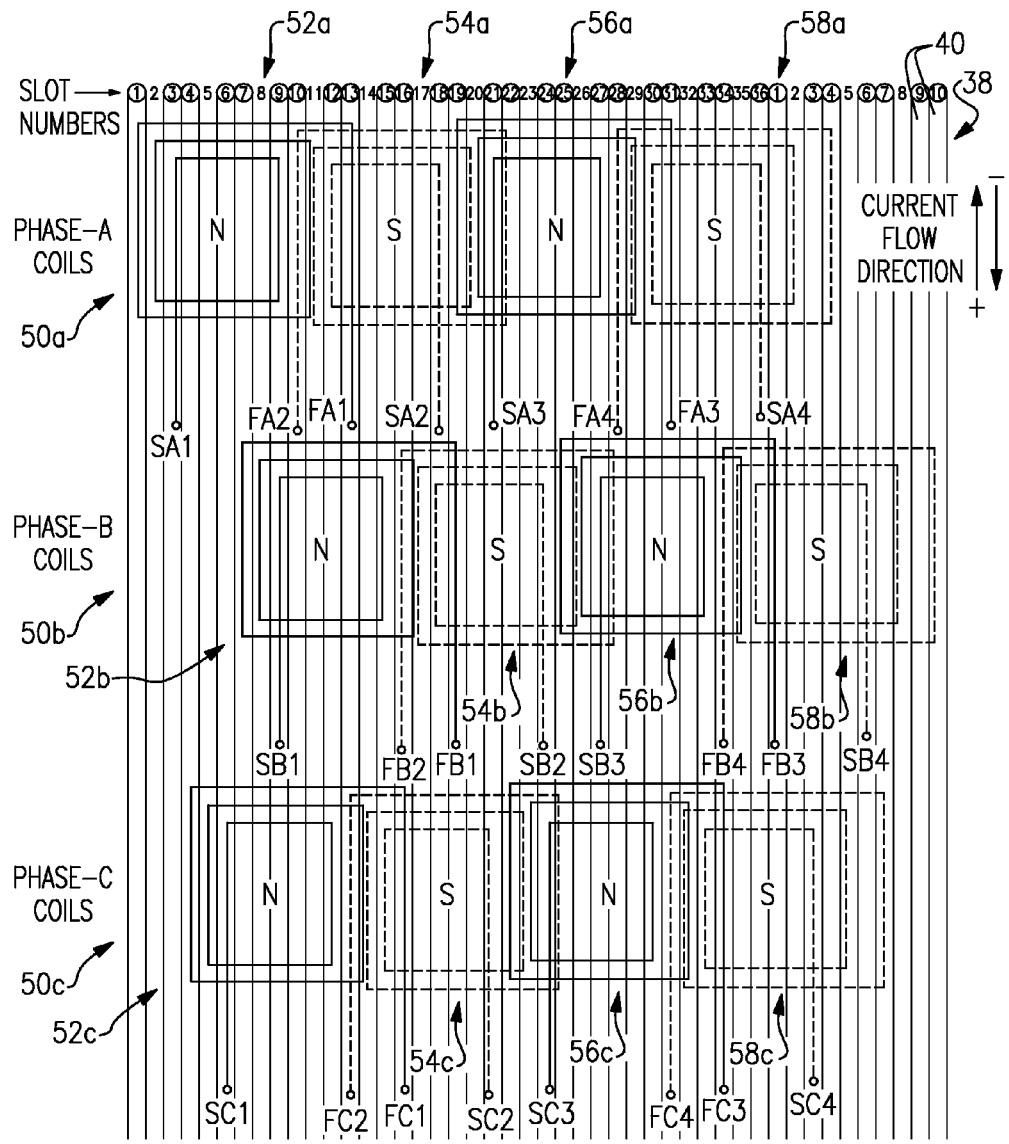
FIG. 3 is a schematic plan view of the slots illustrating multiple phases with multiple coils arranged within the slots.

Referring to FIGS. 3 and 4, the stator support 38 includes multiple phases 50a, 50b, 50c (collectively "50") each including multiple coils. In the example, three phases 50 are used and each phase includes four coils: phase-A 50a includes first, second, third and fourth coils 52a, 54a, 56a, 58a; phase-B 50b includes first, second, third and fourth coils 52b 54b, 56b, 58b; phase-C 50c includes first, second, third and fourth coils 52c, 54c, 56c, 58c. The coils are denoted numerically in FIG. 3, e.g., A1, A2, A3, A4 for the phase-A coils.

Each of the coils has first and second opposing sides of conductor provided in the slots 40, which is defined by the flow of current (indicated by the arrows on the right-hand side of FIG. 3). The current flows in each coil from the start of the coil conductor "SC" to its finish "FC." In one example, "first sides" provide current in a first direction and "second sides" provide current in a second direction opposite the first direction. Within a given phase the coils are connected successively from start to finish. For example, for the phase-A coils, the connections are SA1-FA1-SA2-FA2-SA3-FA3-SA4-FA4. Although discrete conductors are illustrated for ease of stator assembly, it should be understood that fewer or more conductors could be used to construct a phase. The "starts" of the conductors of adjoining coils within a phase are near one another and the "finishes" of adjoining coils within the same phase are near one another to reverse the polarity of the adjoining coils such that the coils' poles alternate N-S-N-S.

FIG. 3 is a schematic in that it only illustrates the coils extending along a portion of the slots 40 for clarity rather than their full axial length. FIG. 4 illustrates an example arrangement of the coil conductors in their respective slots, although the position of the conductor within the slot may be other than shown. That is, the conductors may be swapped with respect to their radial position within the slot.

With continuing reference to FIGS. 3 and 4, a conductor (in slot 11) in a second side (the FA1 side) of a first phase first coil 52a is interspersed with a conductor (conductors in slots 8 and 10) in a second phase first coil 58b. Conductors in a first side (the SA1 side) of the first phase first coil 52a are adjacent to one another and non-interspersed (slots 1-2-3). In this manner, only interspersing conductors of different phase coils on one side and not the other reduces harmonics.

Additionally, one conductor (in slot 12) of a third phase first coil 52c is interspersed with a conductor (conductors in slot 11 and 13) of the first phase first coil 50a second side (the FA1 side) in the first layer (shown in "layer 1" in FIG. 4). In one example, at least one conductor (slot 11) of the first phase second coil 54a second side (the FA2 side) shares a slot with a conductor of the first phase first coil 52a second side (the FA1 side).

Although an example embodiment has been disclosed, a worker of ordinary skill in this art would recognize that certain modifications would come within the scope of the claims. For that reason, the following claims should be studied to determine their true scope and content.

What is claimed is:

1. A stator comprising:
   a stator support including multiple axially extending circumferentially arranged slots;
   multiple phases each including multiple coils, each of the coils having first and second opposing sides of conductor provided in the slots; and
   a conductor in a second side of a first phase first coil interspersed with a conductor in a second phase first coil, and conductors in a first side of the first phase first coil adjacent to one another and non-interspersed.

2. The stator according to claim 1, wherein the multiple phases each include multiple concentric coils arranged in first and second winding layers within the slots.

3. The stator according to claim 2, wherein stator includes only two winding layers, and the number of multiple phases is three.

4. The stator according to claim 3, wherein the number of slots is thirty-six.

5. The stator according to claim 4, wherein the number of coils in each phase is four.

6. The stator according to claim 2, wherein at least one conductor in a second side of a first phase second coil is interspersed with the first phase first coil first side conductors.

7. The stator according to claim 6, wherein the at least one conductor of the first phase second coil second side shares a slot with a conductor of the first phase first coil second side.

8. The stator according to claim 7, wherein one conductor of a third phase first coil is interspersed with the first phase first coil second side in the first layer.

9. The stator according to claim 1, wherein one conductor of a third phase first coil is interspersed with the first phase first coil second side in a first layer, and the conductor of the first phase first coil second side interspersed with the conductor in a second phase first coil in the first layer.

10. The stator according to claim 1, wherein the first sides provide current in a first direction and the second sides provide current in a second direction opposite to the first direction.

11. A stator comprising:
    a stator support including multiple axially extending circumferentially arranged slots providing two winding layers;
    three phases each including multiple coils, each of the coils having first and second opposing sides of conductor provided in the slots; and
    a conductor in a second side of a first phase first coil interspersed with a conductor in a second phase first coil in a first layer, and conductors in a first side of the first phase first coil adjacent to one another and non-interspersed, and a conductor of a third phase first coil is interspersed with the first phase first coil second side in the first layer.

12. The stator according to claim 11, wherein at least one conductor in a second side of a first phase second coil is interspersed with the first phase first coil first side conductors, wherein the at least one conductor of the first phase second coil second side shares a slot with a conductor of the first phase first coil second side.

13. The stator according to claim 11, wherein the number of slots is thirty-six, and the number of coils in each phase is four.

14. The stator according to claim 11, wherein the first sides provide current in a first direction and the second sides provide current in a second direction opposite the first direction.

15. A method of winding a stator comprising:
    assembling multiple phases each including multiple coils into slots on a support such that each of the multiple coils includes first and second opposing sides in the slots;
    assembling a conductor in a second side of a first phase first coil interspersed with a conductor in a second phase first coil; and
    assembling a conductor in a first side of the first phase first coil adjacent to one another and non-interspersed.

16. The method of winding as recited in claim 15, wherein each of the multiple phases include multiple concentric coils that are assembled in first and second winding layers within the slots.

17. The method of winding as recited in claim 16, including interspersing at least one conductor in a second side of a first phase second coil with the first phase first coil first side conductors.

18. The method of winding as recited in claim 15, including interspersing one conductor of a third phase first coil with the first phase first coil second side in a first layer and interspersing the conductor of the first phase first coil second side with the conductor in a second phase first coil in the first layer.

* * * * *